April 14, 1964

TOSHIKAZU YUSA 3,128,562

AZIMUTH COMPASS

Filed June 30, 1961

2 Sheets-Sheet 1

INVENTOR.
TOSHIKAZU YUSA
BY
Barnes, Kisselle,
Raisch & Choate
ATTORNEYS

April 14, 1964 TOSHIKAZU YUSA 3,128,562
AZIMUTH COMPASS

Filed June 30, 1961 2 Sheets-Sheet 2

INVENTOR.
TOSHIKAZU YUSA
BY
Barnes, Kisselle,
Raisch & Choate
ATTORNEYS

United States Patent Office
3,128,562
Patented Apr. 14, 1964

3,128,562
AZIMUTH COMPASS
Toshikazu Yusa, 1054 Oyama-cho, Yoyogi,
Shibuya-ku, Tokyo, Japan
Filed June 30, 1961, Ser. No. 121,140
2 Claims. (Cl. 33—223)

This invention relates to a ball-type compass and more particularly to that type of compass which uses a double-ball assembly with a fluid medium for establishing balance and control.

It is an object of the present invention to provide a compass which gives an accurate magnetic azimuth at all times and which needs no directional needle.

It is an object of the present invention to provide a compass which regardless of the swinging or rolling motion of the vehicle in which it is mounted, always shows the magnetic direction and the azimuth accurately.

Briefly, the invention comprises the use of a transparent outer sphere with an internal ball mounted therein with means for maintaining it substantially concentric, providing liquid material within both balls but also providing an air space within the inner ball with a communication between the two balls. The permanent magnet for the magnetic operation is mounted on the inner ball.

Other objects and features of the invention relating to details of construction and operation will be apparent in the following description and claims.

Figure 1:
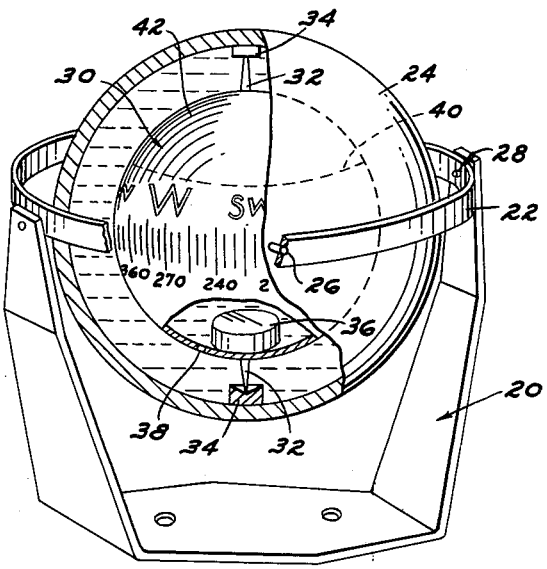

Drawings accompany the disclosure and the various views thereof may be briefly described as:

FIGURE 1, a view of a completed structure showing the relationship of the magnet parts.

Figure 2:
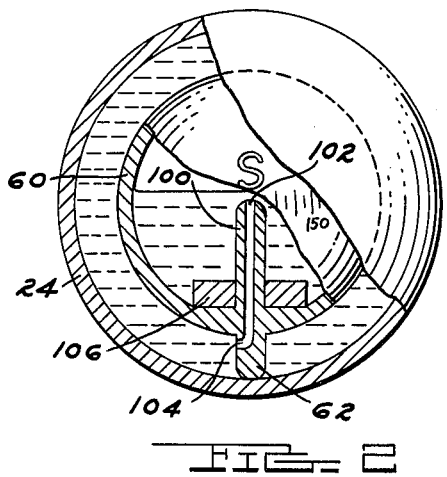

FIGURE 2, a sectional view of a modified construction.

FIGURES 3 to 7, views of modifications of the internal ball structure.

Figure 8:
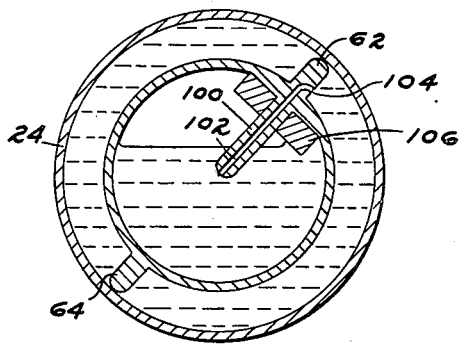

FIGURE 8, a view of the ball assembly showing the manner in which it can be rotated.

Figure 9:
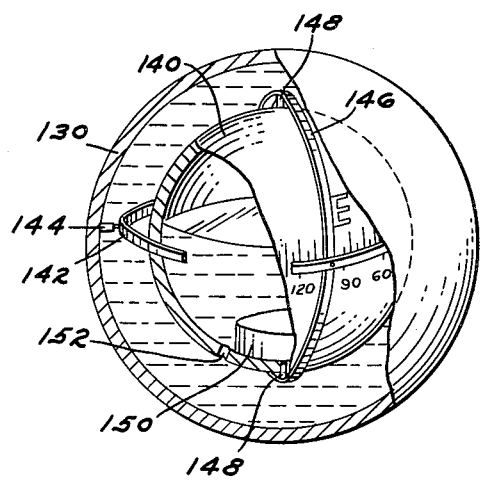

FIGURE 9, a view of a modified assembly eliminating the connector tube.

Figure 10:
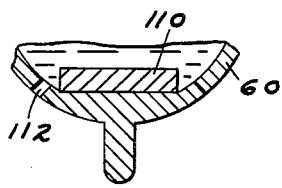

FIGURE 10, a sectional view of the modified construction.

Figure 11:
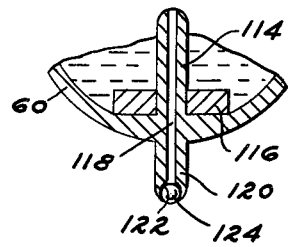

FIGURE 11, a sectional view of a modified structure.

Referring to the drawings:

Basically, the idea of this compass includes a spherical ball inside a spherical housing, the ball itself being hollow and partially filled with fluid. A venting system permits a fluid connection from the inside of the ball to the main chamber of the outer container, thus making the interior of the ball the expansion space for thermal changes in the entire unit. The size of the air chamber in the interior of the ball also determines buoyancy and therefore controls the bearing pressures and the freedom of the ball. The device is useful for marine craft and aircraft as well as land vehicles and might also be used for personal use in smaller form.

More specifically, with reference to the drawings, a U-shaped supporting bracket 20 carries a ring 22 which in turn supports a transparent plastic ball 24. The ball 24 is gimbaled by pivots 26 in the ring 22 which itself is gimbaled by pivots 28 on the legs of the bracket 20. Inside the transparent ball 24 is a hollow ball 30 having a dial arranged equatorially around it, the ball being supported by pins 32 acting in polar pivots 34. Within the ball 30 is a disc-like permanent magnet 36 at the bottom polar pivot area. Adjacent the magnet 36 is a liquid opening 38 which established a connection between the interior of the ball 30 and the interior of the ball 24. Liquid level in the ball 30 is indicated at 40 there being an air space 42 above the liquid level.

The outer ball may be made from transparent material such as acryl, glass and the like and will contain a liquid such as oil, glycerine, alcohol, etc.

Figure 3:
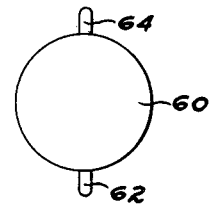
Figure 5:
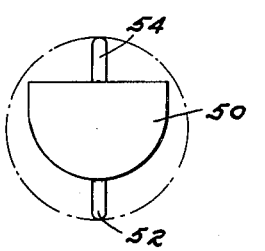

The shape of the internal ball 30 can vary, for example, to a shape shown in FIGURE 5 where a closed cup-shaped element 50 is shown having a bottom support post 52 and an upper support post 54. In FIGURE 3 a circular ball 60 is shown with a bottom support post 62 and a top support post 64.

Figure 4:
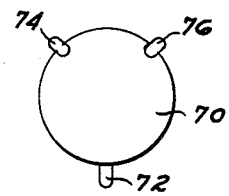

In FIGURE 4, a ball element 70 has a bottom support post 72 with two supporting knobs 74 and 76 for maintaining the spacing within the outer ball. In the embodiment shown in FIGURE 6, the ball 80 has a bottom support post 82 and two cylindrical elements 84 and 86 at opposite poles to provide spacing contact.

Figure 7:
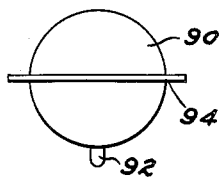
Figure 6:
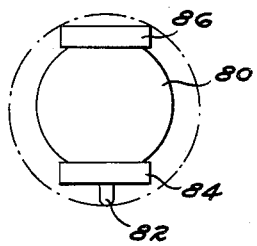

In FIGURE 7, a ball 90 has a bottom support post 92 with a surrounding ring 94 centrally of the device to provide the spacing.

In FIGURE 2, a sectional view of the device illustrated and outlined in FIGURE 3 is shown wherein within the outer ball 24 the inner ball 60 is mounted on the posts 62 and 64. It will be seen that there is within the ball 60 an upstanding spigot member 100 having an internal passage 102 which connects at a port 104 to the interior of the outer ball, the passage connecting at the end of the spigot 100 to the interior of the inner ball. A magnet 106 surrounds the spigot 100 at the base of the interior of the ball 60. With this arrangement the ball can pivot even to a point shown in FIGURE 8 without losing the liquid-to-liquid contact between the interior and exterior fluid bodies.

In FIGURE 10, a modified construction showing an internal ball 60 has a solid magnetic disc 110 with a connecting passage 112. This structure can be used for a very smooth operating compass which is not subject to violent changes of position.

In FIGURE 11, an internal ball is shown with a vertical spigot 114 surrounded by a magnet 116, the spigot having a central passage 118 extending directly down to the bottom of a support post 120. At the contact point of the support post is an enlarged opening 122 containing a ball 124 which serves as a bearing mount without inhibiting the passage of fluid between the exterior and the interior of the ball.

In FIGURE 9, a device is shown having an outer ball 130 with an inner ball 140 gimbaled in two directions by an outer ring 142 pivoted at 144 and an inner ring 146 pivoted at 148 to the inner ball. A suitable magnet 150 is disposed in the bottom of the ball 140 and a passage 152 connects the interior of the two spheres.

In the operation of the device, it will be seen that a vehicle carrying the compass may be subject to rather violent motion which with an ordinary compass would require time for the needle to settle in order to be read, while with the present invention, regardless of the swing or roll, the dial of the compass always shows the magnetic direction and the azimuth accurately. The air space in the interior sphere permits expansion and contraction of the liquid volume and also possibly a change in the absorption of the air into the liquid without affecting the operation. The motion of the spheres is dampened by the liquid to provide a smooth operation and where extreme changes in position are a common occurrence, the spigot arrangement shown in FIGURES 2 and 8 can be used to maintain proper communication between the interiors of the spheres.

What is claimed is as follows:

1. A compass comprising:
   (a) an outer transparent body such as a sphere and an inner rotatable hollow body within said outer body, said inner body having mounted thereon a magnet responsive to the magnetic field of the earth to orient the interior body relative to the outer body,
   (b) a quantity of liquid partially filling the inner body and completely filling the space between the inner body and the outer body, the remainder of the space in the inner body being filled with a gas, and (c) means to connect the interior of said inner body with the space between said inner body and said outer body comprising a spigot projection extending radially from an interior wall of said inner body toward the center thereof wherein the end of said spigot is constantly immersed in the liquid within said inner body regardless of the relative position of said bodies, said projection having a passage connecting the inside of said inner body to the space between said inner and outer bodies, (d) said spigot projection extending inwardly and outwardly from the walls of the inner body, the outward projection serving to locate the inner body relative to the outer body while carrying the connecting passage.

2. A device as defined in claim 1 in which a ball bearing is mounted at the outer end of said projection to contact the inner wall of said sphere.

References Cited in the file of this patent

UNITED STATES PATENTS

| | | |
|---|---|---|
| 1,274,333 | Roland | July 30, 1918 |
| 2,192,148 | Otto | Feb. 27, 1940 |
| 2,260,396 | Otto | Oct. 28, 1941 |
| 3,011,264 | Parera | Dec. 5, 1961 |

FOREIGN PATENTS

| | | |
|---|---|---|
| 311,426 | Germany | Mar. 27, 1919 |
| 92,340 | Switzerland | May 7, 1938 |